United States Patent [19]

Redington

[11] 3,986,761

[45] Oct. 19, 1976

[54] METHOD OF MANUFACTURING SEMICONDUCTOR CAMERA TUBE TARGETS

[75] Inventor: Rowland W. Redington, Schenectady, N.Y.

[73] Assignee: General Electric Company, Schenectady, N.Y.

[22] Filed: Aug. 5, 1965

[21] Appl. No.: 477,615

[52] U.S. Cl. .................................. 316/17; 29/25.14; 29/25.17; 29/572; 317/19

[51] Int. Cl.² .......................................... H02H 1/02

[58] Field of Search ............... 29/25.14, 25.17, 25.3, 29/25.3 D, 25.3 H, 569, 572, 576; 316/17, 18, 19

[56] References Cited

UNITED STATES PATENTS 2,981,777 4/1961 Reynolds .............................. 29/572

3,185,891 5/1965 Redington et al. ............... 29/572 X

*Primary Examiner*—Harold J. Tudor

*Attorney, Agent, or Firm*—Jerome C. Squillaro; Joseph T. Cohen; Julius J. Zaskalicky

EXEMPLARY CLAIM

1. The method of manufacturing a camera tube target from a semiconductor material for placement in a camera tube prior to degassing thereof comprising the steps of initially doping the semiconductor material with an impurity for rendering it sensitive to a desired radiation spectrum but in a quantity less than required for sensitivity in said desired radiation spectrum; annealing said semiconductor material at a temperature greater than the subsequent degassing temperature for a period of time effective to increase the impurity concentration to a level sufficient to render the semicoductor material sensitive to the desired radiation spectrum, said concentration being substantially more stable at lower degassing temperatures than the initial impurity concentration; positioning said semiconductor material as a target within a radiation sensitive camera tube enclosure; and degassing said camera tube enclosure by heating said enclosure including said target for driving the gas from said enclosure.

8 Claims, 5 Drawing Figures

Figure 5:
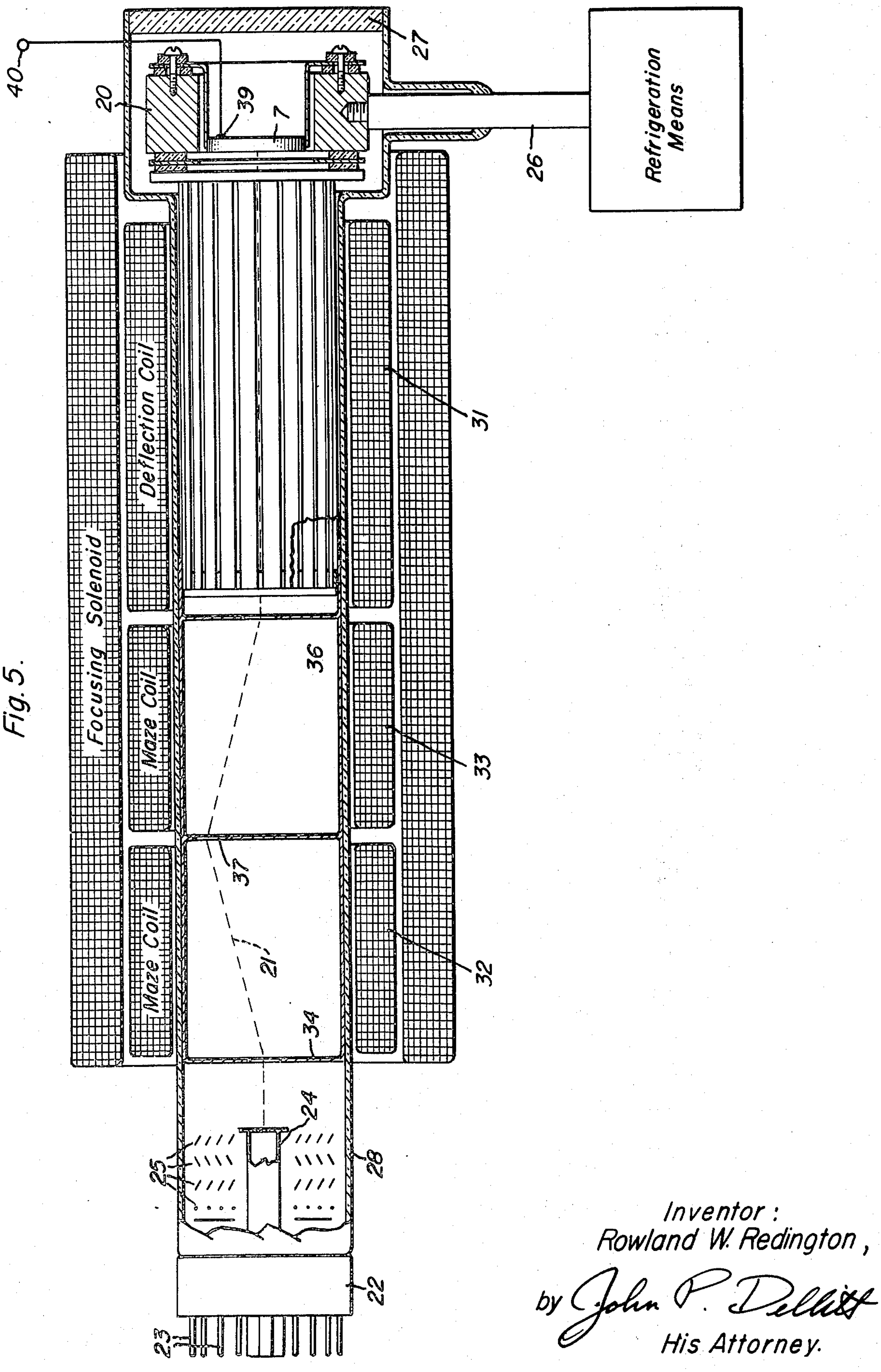

Fig. 1.
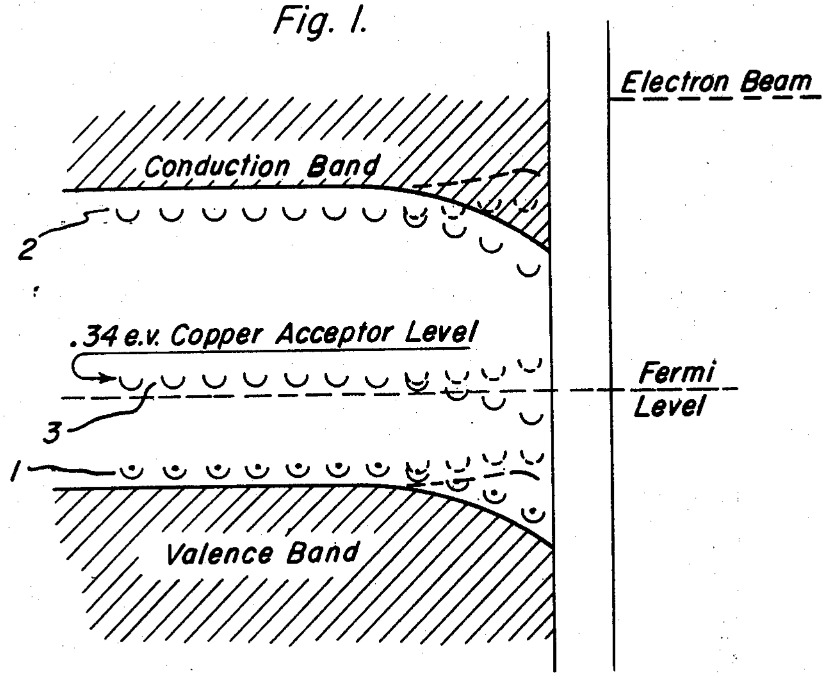
Fig. 2.
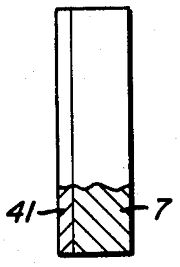
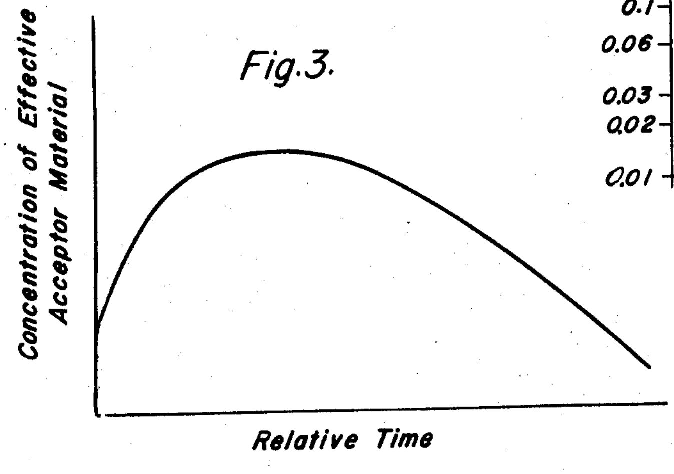
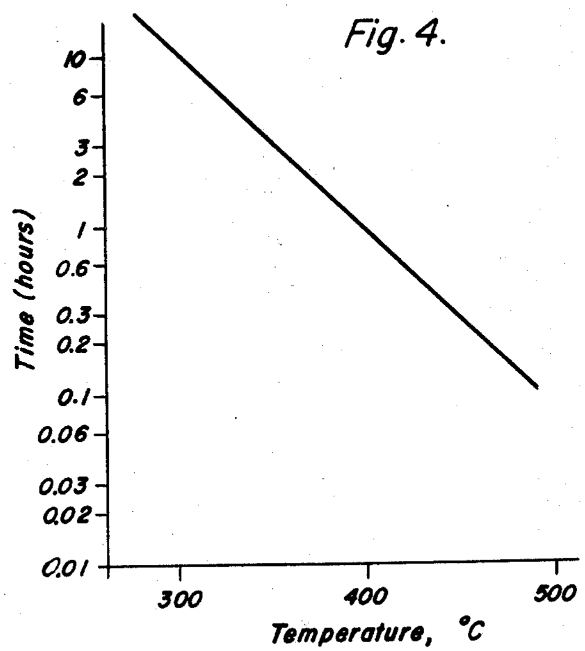
Inventor:
Rowland W. Redington,
by John P. DeVitt
His Attorney.

Inventor:
Rowland W. Redington,
by John P. DeWitt
His Attorney.

METHOD OF MANUFACTURING SEMICONDUCTOR CAMERA TUBE TARGETS

This invention relates to methods of manufacturing semiconductor targets for television type camera tubes and particularly to such methods rendering the targets more stable during the preparation of the tube.

A semiconductor forms a useful photosensitive element and can be rendered sensitive to selected regions of spectral radiation. A relatively thin semiconductor employed as a photoconductive target in a television-type camera tube becomes less resistive across its thickness at a point where detected radiation strikes the target. Radiation photons striking the target generate current carriers in the target and these carriers change the target charge as seen by a scanning electron beam with the electron beam providing the output of the device.

With appropriate impurity dopings, a semiconductor target can be made sensitive to various portions of the visible and invisible spectrum. For example, $copper^{II}$ doped germanium is sensitive to the infrared region between 1½ and 4 microns while $zinc^{II}$ doped germanium is sensitive to the infrared between 8 and 15 microns.

Targets of the semiconductor type have suffered a certain disadvantage as employed in a completed camera tube because of the difficulty in preparing and manufacturing the tube. A heating process conventionally accomplishes diffusion of impurity doping material into the semiconductor. Then additional heating or baking of the completed tube for degassification purposes has a deleterious effect upon the concentration of doping already achieved in the tube's target. The concentration of the doping impurity may change rendering the semiconductor sensitive to an entirely different and sometimes undesired frequency range; for example, $copper^{II}$ doped germanium can become $copper^{I}$ doped germanium upon heating. On the other hand, if degassification or bakeout is neglected, vacuum maintenance problems in the tube frequently result and also blemish problems upon the target can arise as a result of the migration of "dirt" from other tube parts to the sensitive semiconductor target.

It is therefore a principal object of the present invention to provide a method of manufacturing semiconductor camera tube targets resulting in a target of a desired spectral sensitivity in a properly degassed camera tube.

Another object of the present invention is to provide a semiconductor camera tube target which can be raised to conventional degassing temperatures after installation in a camera tube enclosure.

In accordance with the present invention in a particular embodiment thereof, a camera tube semiconductor target is provided with an impurity for rendering it sensitive within a desired radiation spectrum. However, the impurity is provided in a quantity less than ultimately required. After doping, conventionally accomplished as a diffusion process at high temperatures, the semiconductor target is annealed at a lower temperature than the diffusion temperature, but at a temperature higher than employed in subsequent degassing or bakeout of the completed tube. It is found the diffused impurity actually appears to increase in an effective concentration during the annealing process to a point where its concentration levels out to a substantially maximum value. When the target is now placed in the enclosure of a camera tube, the tube can be raised in temperature accomplishing conventional degassing or bakeout without materially changing the effective doping or spectral response of the target.

In accordance with a particular embodiment of the invention, a $copper^{II}$ doped germanium target, having initial n-type impurity balanced with copper to the extent of one-third to one-half the amount of copper which would result in $copper^{II}$ doped germanium, is annealed at a temperature lower than the copper diffusing temperature but higher than the subsequently employed degassing temperatures. The annealing is continued until the effective copper doping reaches an approximate maximum about equal in atomic percentage to the initial n-type impurity. The target as thus prepared is placed in a camera tube enclosure and degassed without ill effect.

The subject matter which I regard as my invention is particularly pointed out and distinctly claimed in the concluding portion of this specification.

The invention, however, both as to organization and method of operation, together with additional advantages and objects thereof, may best be understood by reference to the following description taken in connection with the accompanying drawings wherein like reference characters refer to like elements and in which:

FIG. 1 is an energy diagram illustrating energy levels for $copper^{II}$ doped germanium, FIG. 2 is a camera tube target, partially in crosssection, coated with acceptor metal during an acceptor metal diffusion step, FIG. 3 is a plot of effective concentration of acceptor material vs. relative time, in the annealing step according to the present invention, FIG. 4 is a plot of time vs. temperature from which the combination of time and temperature appropriate for annealing $copper^{II}$ doped germanium can be determined, and FIG. 5 is a completed camera tube including a target prepared in accordance with the present invention.

A camera tube target formed in accordance with the present invention is constituted of extrinsic semiconductor material, that is semiconductor material which contains certain specified impurities in order to render it suitably conductive or photoconductive. In accordance with a specific embodiment, p-type semiconductor material is employed as an infrared detecting target wherein such target is initially formed form semiconductor material which is at first n-type. For example, n-type germanium, containing arsenic or antimony impurities, then has added thereto a quantity of copper metal which approximately balances the said arsenic or antimony in atomic percentage. Lower "energy states" 1 of the copper impurity act to compensate or "trap" the electrons from the higher energy state 2 of the n-type donor (arsenic or antimony) material. These energy states are depicted in FIG. 1. The resulting compensated material is then effectively of the p-type having a usable acceptor level 3 at approximately 0.34 electron volts above the germanium "valence band" shown in the FIG. 1 energy diagram. When a quantum of radiation strikes the semiconductor, an electron may be raised thereby from the top of the valence band to the 0.34 electron volt level, this energy differential corresponding to radiant energy excitation of about 4 microns in wavelength, that is, radiant energy in the usable infrared spectrum. As a result of the radiation, a conducting hole is left in the valence band capable of effecting an electrical output indication. Of course electrons excited from slightly below the top of the valence band will correspond to slightly shorter wavelengths, etc. It therefore follows that a semiconductor target with this impurity acceptor level will be sensitive to and receive energies in the infrared radiation region.

Copper as a p-type impurity, in addition to providing an energy level appropriate to infrared detection, provides sufficient electron mobility and sufficient dark current resistivity, particularly at low temperatures, to function well in a photoconductive target. The dark current resistivity of the copper doped or copper impurity containing germanium employed increases from about 1 ohm-centimeter at room temperatures to greater than $10^{12}$ ohm centimeters at the boiling temperature of liquid nitrogen.

The semiconductor target may be constructed in accordance with one feature of the present invention by copper plating a slightly oversized target wafer blank of commercially available n-type germanium, containing an arsenic or antimony impurity. The target 7 blank is illustrated in FIG. 2 including a copper coating 41 on the scanned side thereof. The plated blank is heated or roasted for approximately a day or two allowing the metal to diffuse into the semiconductor blank. The temperature at which this heating is carried out is determined by the initial amount of n-type impurities, i.e., the arsenic or antimony, initially included in the semiconductor blank, as conveniently determined, for example, by Hall effect measurements. It is desired in accordance with the present invention to add about one-third to one-half enough copper impurity by this heat-diffusion process as it would take to balance off the n-type impurity with approximately 95% or so as much copper acceptor metal by atomic percentage. The amount of metal added by the heating process is understood to be a function of the temperature at which the process is carried out and is therefore determined from solid solubility curves of a metal in a semiconductor, e.g., copper in germanium. For such a chart, reference may be had to page 86, vol. 105, Physical Review, Jan. 1, 1957, "Triple Acceptors in Germanium" by H. H. Woodbury and W. W. Tyler. A typical temperature is on the order of 730° C. The germanium is saturated with copper at the diffusion temperature. While the copper diffuses into the semiconductor, the n-type impurity diffuses out somewhat particularly near the surface. After the coated semiconductor blank is heated for a day or two, long enough to provide the desired concentration of acceptor type material, the copper plating is peeled off or removed by hydrofluoric acid.

After removing the copper from the semiconductor target blank, the electrically active concentration of copper will desirably be from one-third to one-half the concentration of n-type impurity in the semiconductor material. According to the present invention, the effective concentration of acceptor metal is increased to approximately 95% of the concentration of the n-type material by an annealing process. The annealing process is carried out at a temperature less than the temperature at which the copper or other acceptor metal was diffused into the target blank but at a temperature greater than that at which a camera tube, including the target in place, is to be degassed or baked out. Tube bakeout or degassing is conveniently accomplished at a temperature up to 250° C to 300° C for the purpose of removing stray gases from the tube.

Annealing prior to bakeout is, however, accomplished at a temperature higher than the 250° C to 300° C bakeout temperature and up to about 500° C. The purpose of this annealing in accordance with the present invention is twofold. (1) the concentration of acceptor metal is increased to about 95% of the donor impurity by atomic percentage; and (2) establishing a balance between the acceptor and donor material in this way renders the tube target stable during the subsequent degassing or bakeout of the camera tube with the semiconductor target in place.

FIG. 3 illustrates what happens in the anneal process as plotted along a relative time scale. As can be seen, concentration of effective acceptor material increases for a time and then levels off. It is desirable to reach the top of the curve at the time when the acceptor concentration approximately balances (e.g. reaches about 95% of) the n-type impurity and then the anneal is discontinued. Therefore, the target blank was initially provided with acceptor metal in the range from one-third to one-half the n-type impurity as represented at the left-hand extremity of the curve.

If annealing were continued after reaching the apex of the curve, the acceptor metal would leave the semiconductor as can be seen from the curve trail-off at the right hand side of the FIG. However, if the annealing is concluded at the approximate level top of the curve, the acceptor concentration will not noticeably change during subsequent degassing or bakeout at a somewhat lower temperatue.

When a target is annealed, many different and competing processes can take place. Copper can diffuse to a surface or to a dislocation and precipitate out. Copper can form complexes with other impurities or with itself, and some of these can change the hole concentration. For example, a copper complexed with a donor may have the third copper acceptor level lowered enough in energy by the coulomb field of the donor to bring this level close enough to the Fermi level so that it could affect the conductivity. The exact processes involved in the anneal have not been determined. However, the general explanation is quite clear. As a function of time, at the annealing temperature, the hole concentration rises quite rapidly at first, passes through a maximum, and then slowly decreases. If the annel is continued long enough, the sample would eventually become n-type, showing that most of the copper has left. The slow decrease is affected by the nature of the ambient in which the anneal is performed. For example, if the sample is in contact with an indium gettering bath, the sample may become n-type in a few minutes at 400° C. In a hydrogen atmosphere, the maximum in the hole concentration occurs at less than 1 hour at 400° C, and it takes several hours (about 10) for the sample to become n-type. In a vacuum anneal the maximum occurs slightly later and the hole concentration decreases at an even slower rate than it does for a hydrogen atmosphere anneal. Presumably the difference between the hydrogen atmosphere anneal and the vacuum anneal is in the rate at which copper can leave the surface of the crystal. The oxygen partial pressure is lower in the vacuum case, and if the copper is leaving as copper oxide, the rate of departure would be slower. The time required for the annealing step varies with the temperature of the anneal. For example, a convenient compromise between temperature and the time required for the anneal occurs at 400° C; at this temperature the anneal should last approximately one hour in a hydrogen atmosphere in order to bring the acceptor material up to the desired concentration.

FIG. 4 is a curve of time vs. temperature for approximately reaching the desired apex of the FIG. 3. The curve of FIG. 4 is accurate for annealing in a hydrogen atmosphere but is approximately correct for vacuum conditions. An anneal at 400° C should last approximately 1 hour. If the temperature is lowered to 300° C annealing would then take approximately ten hours. If, on the other hand, the temperature is raised to 475° C annealing may be accomplished in approximately 10 minmutes, but is somewhat more sensitive and difficult to control in this temperature region. As previously indicated, the times for the anneal are slightly longer under vacuum conditions than in hydrogen. Vacuum annealing is preferred prior to bakeout in an evacuated tube.

The subsequent degassing or bakeout of the tube should be accomplished under the same environmental conditions as those present in the anneal. If the target is prepared by annealing in a hydrogen atmosphere it is stable in a hydrogen atmosphere bake, but not as stable in a vacuum bake. If, on the other hand, the anneal is at 1 hour at 400° C in vacuum, the target is then stable in a vacuum bake. The stability clearly arises from the balance of two or more competing processes, one of which involves the ambient condition at the surface and therefore the target must be prepared with the ambient condition in mind. After annealing and before placement in the tube for bakeout, the target is subjected to a glow discharge either as disclosed and claimed in my copending application Ser. No. 56,799, filed Sept. 19, 1960, now U.S. Pat. No. 3,781,955, entitled "Method of Manufacturing Semiconductor Camera Tube Targets" and assigned to the assignee of the present invention, or in my copending currently filed application Ser. No. 477,613, filed Aug. 8, 1965, now U.S. Pat. No. 3,401,107 entited "Method of Manufacturing Semiconductor Camera Tube Targets", also assigned to the assignee of the present invention. This discharge involves ion bombardment for the purpose of eliminating undesired sidewise conductivity in the target by removing an undesired potential barrier. The semiconductor material near the target's scanned surface is caused to have nearly the same polarity characteristics as the interior of the target. As a result, the bands and energy states tend to straighten somewhat near the surface as indicated by the dashed lines in FIG. 1. As also set forth and claimed in my copending concurrently filed application, Ser. No. 477,613, this ion glow bombardment, when applied for a somewhat longer period of time to the side of the target opposite the scanned side, can also be employed for providing a conducting electrode upon the semiconductor target.

FIG. 5 illustrates a complete camera tube employing the present target and includes a long cylindrical glass envelope 28 closed with a base 22 providing conections 23 for electron gun structure 24 and electron multiplier output device 25. A mask 34 at the electron gun end of the tube has a central aperture to receive electron beam 21 while partition 36 near the middle of the tube has a similar aperture. An intermediate aperture partition 35 has its aperture 37 radially displaced and the elctron beam 21 is caused to pass through said aperture without being accompanied by unwanted heat radiation. Maze coils 32 and 33 deflect the electron beam 21 through the illustrated path. The electron beam is caused to scan photoconductive semiconductor target 7 through the magnetic action of deflecton coils 31.

Annular member 20 acts to support the semiconductor target 7 and conduct heat therefrom. In the infrared detection region it is frequently desirable to operate the target at temperatures near the temperature of liquid nitrogen or below. To this end, cold finger 26 is joined to annular member 20 and passes through a seal in glass envelope 28. Connection 39 joined to the target is coupled to terminal 40 maintained by means not shown at a positive voltage. Radiation is received through windown 27.

Aspects of the construction and operation of this tube are further described and claimed in the patent of Rowland W. Redington and Pieter J. VanHeerden, No. 3,185,891, assigned to the assignee of the present inventon. Briefly, according to tube operation, the target 7 receives radiation through window 27, appearing as a pattern upon the target and causing a variable amount of conduction of current carriers (holes) through the target. Electron gun 24 produces a relatively slow stream of electrons 21 focused at the opposite surface of target 7 and caused to deflect in an appropriate television type raster by deflection coils 31. The deflection field of these coils is arranged such that the electron beam scans the back side of target 7 depositing or attempting to deposit electrons thereon, while the other side of the target is maintained at a positive voltage. A quantum of radiant energy excites the free hole which becomes a current at the point where the radiation strikes. The hole passes through the target neutralizing the electron beam charge where it passes through. When the target is again scanned with beam 21, just enough electrons are deposited to replace a negative charge removed in the preceding frame in the photoconduction process. The signal output from electron multiplier 25 is a function of return beam electrons returning from the target along the length of the tube.

This tube with the target 7 in place must, of course, be baked out or degassed during its manufacture. As previously indicated, targets have heretofore been undesirably sensitive to the bakeout temperatures and were apt to have their characteristics undesirably changed thereby. However, in accordance with the present invention, the target, as annealed, is stable at the bakeout temperatures for periods of time adequate to accomplish the desired degassing function. For example, targets prepared and annealed in the manner hereinbefore set out have properties which are substantially constant for periods of up to 8 hours at 300° C or for longer periods at 250° C.

Although in the present embodiment the target 7 has been described as a p-type semiconductor, e.g. germanium appropriately doped with copper after a prior doping with arsenic or antimony, and although such a composition has particular advantages especially in the infrared region, it should be noted the stable manufacturing method according to the present invention is applicable to other extrinsic semiconductor materials, for example, silicon. The process of the present invention has been described as applicable to solid targets but this process is also suitable in preparing thin target layers as described and claimed in my copending application Ser. No. 418,920, filed Dec. 16, 1964 and assigned to the assignee of the present invention.

While I have shown and described an embodiment of my invention, it will be apparent to those skilled in the art that many changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. The method of manufacturing a camera tube target from a semiconductor material for placement in a camera tube prior to degassing thereof comprising the steps of initially doping the semiconductor material with an impurity for rendering it sensitive to a desired radiation spectrum but in a quantity less than required for sensitivity in said desired radiation spectrum; annealing said semiconductor material at a temperature greater than the subsequent degassing temperature for a period of time effective to increase the impurity concentration to a level sufficient to render the semiconductor material sensitive to the desired radiation spectrum, said concentration being substantially more stable at lower degassing temperatures than the initial impurity concentration; positioning said semiconductor material as a target within a radiation sensitive camera tube enclosure; and degassing said camera tube enclosure by heating said enclosure including said target for driving the gas from said enclosure.

2. The method of manufacturing a camera tube target from a semiconductor material for inclusion in a camera tube prior to degassing thereof at temperatures lower than 300° C comprising the steps of diffusing an acceptor type impurity into a body of initially n-type semiconductor material at an elevated temperature higher than 700° C; said temperature being sufficient to dope said semiconductor with acceptor type impurity metal in the range from one-third to one-half the n-type impurity by atomic percentage; and annealing said target at a temperature higher than said degassing temperature but lower than 700° C causing the effective acceptor concentration to increase while rendering the target stable during degassing procedures.

3. The method of manufacturing a camera tube target from semiconductor material for inclusion in a camera tube prior to degassing thereof at temperatures lower than 300° C comprising the steps of coating a body of initially n-type semiconductor material with an acceptor-type impurity metal; heating the coated body to a temperature higher than the degassing temperature to cause the metal to diffuse into the semiconductor; said temperature being sufficient to dope said semiconductor with acceptor-type impurity metal in the range from one-third to one-half the n-type impurity by atomic percentage; removing said metal coating; and annealing said target at a temperature higher than said degassing temperature but less than the diffusing temperature of said acceptor-type impurity causing the effective acceptor concentration to increase in approximate balance with the n-type impurity and rendering the target stable during degassing procedures.

4. The method of manufacturing a camera tube target from germanium semiconductor material for placement in a camera tube prior to degassing thereof at temperatures lower than from 250° C to 300° C comprising the steps of diffusing copper into a body of initially n-type germanium at an elevated temperature higher than said degassing temperature which is effective to dope said semiconductor with copper in the range of from one-third to one-half the n-type impurity contained in said germanium by atomic percentage, and annealing said target at a temperature higher than said degassing temperature but lower than said diffusion temperature causing the effective acceptor concentration to increase to a range characteristic of copper$^{II}$ doped germanium while rendering the target stable for degassing procedures.

5. A method of manufacturing a camera tube target from germanium semiconductor material for placement in a camera tube prior to degassing thereof at temperatures lower than 300° C comprising the steps of coating a body of initially n-type impurity containing germanium with an acceptor-type impurity metal; heating the coated body to a temperature higher than 700° C to cause the metal to diffuse into the germanium; said temperature being sufficient to saturate said germanium with acceptor-type impurity metal in the range of from one-third to one-half the n-type impurity by atomic percentage as determined by the temperature-solubility characteristic of the acceptor impurity in germanium; removing said metal coating; and annealing said body at a temperature between 300° C and 500° C for a time sufficient for causing the effective acceptor concentration to increase to a substantially maximum value in approximate balance with the n-type impurity and rendering the target stable for subsequent degassing procedures.

6. The method according to claim 5 wherein said acceptor-type impurity metal is copper and said n-type impurity is selected from the group consisting of arsenic and antimony.

7. A method of manufacturing a camera tube target from germanium semiconductor material for placement in a camera tube prior to degassing thereof at temperatures lower than 300° C comprising the steps of coating a body of initially n-type impurity containing germanium with copper; heating the coated body to a temperature higher than 700° C to cause the copper to diffuse into the germanium, said temperature being sufficient to saturate said germanium with copper in the range of from one-third to one-half the n-type impurity by atomic percentage as determined by the temperature-solubility characteristic of copper in germanium; removing said copper coating; subjecting a surface of said body to ion-glow discharge; and annealing said body at a temperature between 300° C and 500° C for a time sufficient for causing the effective acceptor concentration to increase to a maximum approximating 95% of the n-type impurity, rendering the target stable for subsequent degassing procedures.

8. The method of manufacturing a camera tube target from germanium semiconductor material for placement in a camera tube prior to degassing thereof at a temperature lower than 300° C comprising the steps of diffusing copper into a body of initially n-type germanium at an elevated temperature higher than said degassing temperature which is effective to dope said semiconductor with copper in the range of from one-third to one-half the n-type impurity contained in said germanium by atomic percentage and annealing said target at a temperature between 300° C and 475° C for a time between ten hours and ten minutes in inverse relation to the temperature employed, for rendering the target suitably radiation sensitive and stable during degassing procedures.

* * * * *